(12) United States Patent
Trantham et al.

(10) Patent No.: US 9,442,493 B2
(45) Date of Patent: Sep. 13, 2016

(54) SYSTEM FOR REGULATING PRESSURE DIFFERENTIALS ON A FLUID

(71) Applicants: John M. Trantham, Hurst, TX (US); Peter Volovec, Kapele (SI); Slavko Lah, Slovenia (SI)

(72) Inventors: John M. Trantham, Hurst, TX (US); Peter Volovec, Kapele (SI); Slavko Lah, Slovenia (SI)

(73) Assignee: IMI HYDRONIC ENGINEERING, INC., Dallas, TX (US)

( * ) Notice: Subject to any disclaimer, the term of this patent is extended or adjusted under 35 U.S.C. 154(b) by 195 days.

(21) Appl. No.: 14/028,370

(22) Filed: Sep. 16, 2013

(65) Prior Publication Data

US 2015/0075641 A1    Mar. 19, 2015

(51) Int. Cl.
| | |
|---|---|
| *F24D 19/10* | (2006.01) |
| *G05D 7/01* | (2006.01) |
| *F16K 31/128* | (2006.01) |
| *G05D 16/06* | (2006.01) |
| *G05D 16/10* | (2006.01) |
| *G05D 16/16* | (2006.01) |

(52) U.S. Cl.
CPC ............ *G05D 7/0106* (2013.01); *F16K 31/128* (2013.01); *F24D 19/1036* (2013.01); *G05D 16/0605* (2013.01); *G05D 16/106* (2013.01); *G05D 16/166* (2013.01); *F24D 2220/0264* (2013.01); *Y10T 137/2562* (2015.04)

(58) Field of Classification Search
CPC ............................ F16K 31/128; G05D 7/0106
USPC ....................................................... 137/489.5
See application file for complete search history.

(56) References Cited

U.S. PATENT DOCUMENTS

| | | | | |
|---|---|---|---|---|
| 2,579,334 | A | * | 12/1951 | Plank ............................... 251/54 |
| 2,837,241 | A | * | 6/1958 | Griswold ......................... 222/52 |
| 3,256,905 | A | * | 6/1966 | Griswold .............. F16L 55/027 |
| | | | | 137/454.2 |
| 3,625,246 | A | * | 12/1971 | Reaves .......................... 137/408 |
| 4,117,670 | A | * | 10/1978 | Dombkowsi et al. ..... 60/39.281 |
| 4,768,544 | A | * | 9/1988 | Beam et al. .............. 137/315.04 |
| 5,056,551 | A | * | 10/1991 | Yang et al. ............... 137/315.03 |
| 6,062,257 | A | * | 5/2000 | Wild et al. .................... 137/501 |
| 6,467,505 | B1 | * | 10/2002 | Thordarson et al. ......... 137/613 |
| 8,235,070 | B2 | * | 8/2012 | Stretch ..................... 137/625.48 |
| 2004/0011411 | A1 | * | 1/2004 | Thordarson et al. ......... 137/613 |
| 2007/0056640 | A1 | * | 3/2007 | Matsuzawa et al. .......... 137/613 |
| 2008/0053115 | A1 | * | 3/2008 | Trantham ........................ 62/118 |
| 2009/0308337 | A1 | * | 12/2009 | Imhof et al. ................ 123/41.86 |
| 2015/0075641 | A1 | * | 3/2015 | Trantham et al. ............. 137/110 |

* cited by examiner

*Primary Examiner* — John K Fristoe, Jr.
*Assistant Examiner* — Daniel P Donegan

(57) ABSTRACT

According to an embodiment of the disclosure, a system for regulating a pressure differential includes a plurality of valving elements and a valve activation system. Each of the plurality of valving elements are configured to selectively allow and restrict at least a portion of a flow of fluid between an inlet and an outlet of a conduit through a respective opening and closing of each respective valving element. The valve activation system is configured to supply a common driving pressure to the plurality of valving elements. The common driving pressure is configured to initiate at least one of the opening or closing of the plurality of valving elements or to initiate the other of the opening or closing of the plurality of valving elements.

24 Claims, 4 Drawing Sheets

SYSTEM FOR REGULATING PRESSURE DIFFERENTIALS ON A FLUID

TECHNICAL FIELD

This disclosure is generally directed to valve systems. More specifically, this disclosure is directed to systems for regulating pressure differentials on a fluid.

BACKGROUND

A variety of different heat transfer systems use water or other fluids to transfer heat or thermal energy between one or more production units and one or more loads. Such systems are often referred to as hydronic systems.

SUMMARY

This disclosure provides a system that regulates pressure differentials on a fluid.

According to an embodiment of the disclosure, a system for regulating a pressure differential includes a plurality of valving elements and a valve activation system. Each of the plurality of valving elements are configured to selectively allow and restrict at least a portion of a flow of fluid between an inlet and an outlet of a conduit through a respective opening and closing of each respective valving element. The valve activation system is configured to supply a common driving pressure to the plurality of valving elements. The common driving pressure is configured to initiate at least one of the opening or closing of the plurality of valving elements or to initiate the other of the opening or closing of the plurality of valving elements.

Certain embodiments may provide various technical advantages depending on the implementation. For example, a technical advantage of some embodiments may include using several valving elements in parallel that have less stroke than a single valving element with a similar area provided by the several parallel elements. A technical advantage of other embodiments may include the capability to have valving elements that are easy to machine as compared to large valves. Yet another technical advantage may include the capability to have larger valve sizing using a plurality of valving elements that together function as the larger valve.

Although specific advantages are above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system.

Figure 1:
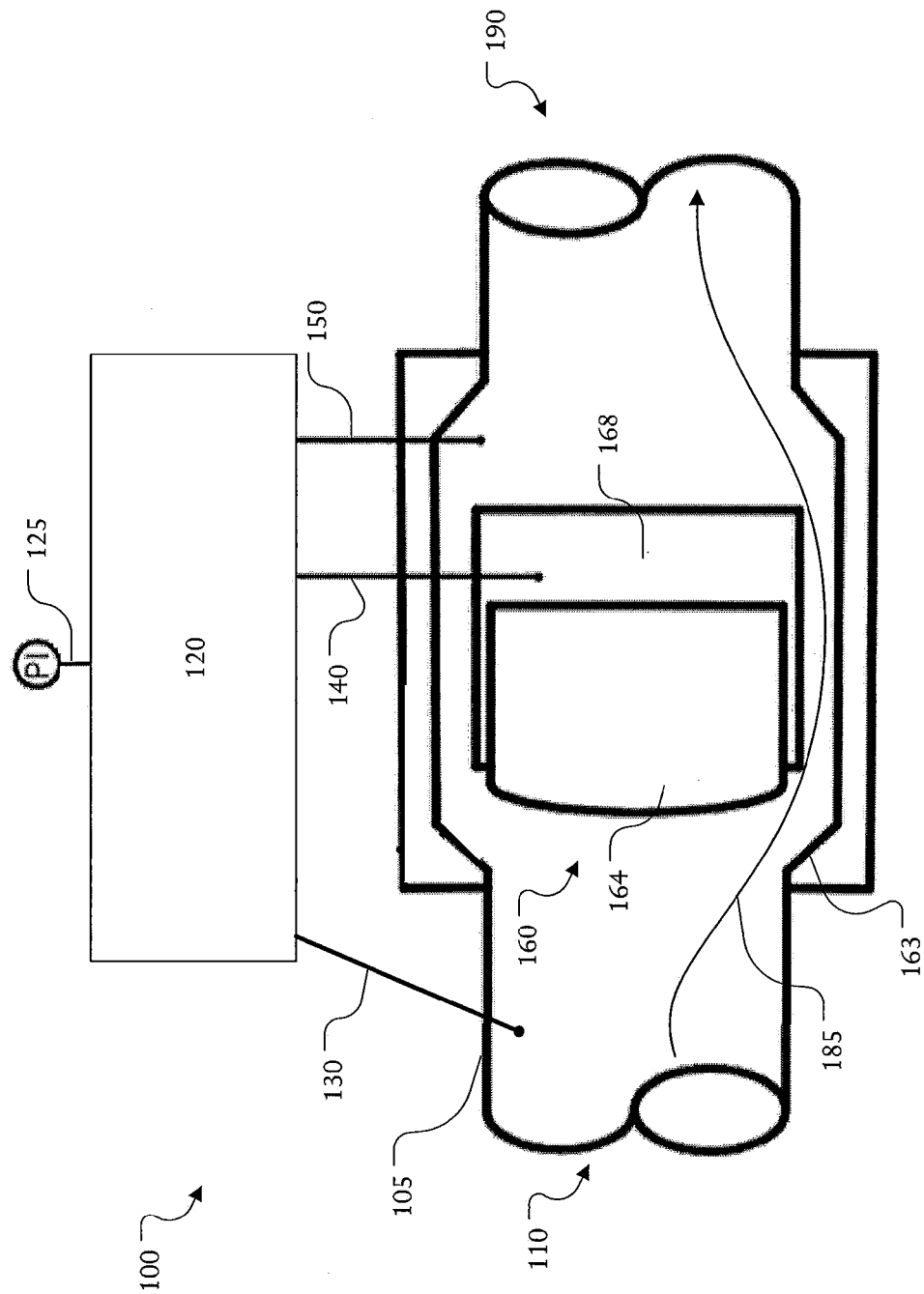
FIG. 1 illustrates basic components of a valve system, according to an embodiment of the disclosure.

FIG. 1 illustrates basic components of a valve system 100, according to an embodiment of the disclosure. In FIG. 1, a valve system 100 is generally shown as a mechanism that controls flow (as generally indicated by line 185) between an inlet 110 and an outlet 190 in a conduit 105. By regulating the flow between the inlet 110 and the outlet 190, pressure or a pressure differential may be regulated. The valve system 100 may be used in virtually any setting, controlling the volume of fluid flowing therethrough. In particular embodiments, the valve system 100 may be used in a hydronic heating or cooling system.

The valve system 100 in this particular embodiment includes a valve activation system 120, a valving element 160, a connection to a pressure (generally indicated by line 125) elsewhere in the system, and fluid lines 130, 140, and 150. The valve system 100 has been simplified for purpose of brevity in illustration and may include more, less, or different components as will become apparent to one of ordinary skill in the art after review of the disclosure.

The valving element 160 include at least a plunger 164 and a chamber 168. In particular configurations, the valving element may be considered a so-called "cartridge." Although only one valving element 160 is shown in this configuration, other configurations that will be described below may include more valving elements that collectively control a flow rate. The valving element 160 is generally configured to restrict or allow the passage of fluid between the inlet 110 and the outlet 190. By restricting passage (or possibly even eliminating passage) of fluid between the inlet 110 and the outlet 190, pressure is increased. A certain pressure or pressure differential may be desired. For example, in particular configurations, a pressure differential across a load may be desired. The valving element 160 through modification of the flow rate allow such a pressure differential to be maintained as will be described in further details below.

The conduit 105 may have features therein that interact with the valving element 160 in order to selectively restrict or allow passage of fluid flow. As a non-limiting example, the 164 plunger may push up against a seat 163.

The valve activation system 120 is generally configured to open and close the valving element 160 based on comparing the detected difference between pressure, P1, from fluid line 125 and pressure, P2, which is provided through fluid line 130 to a set pressure difference. Pressure, P2, denotes the pressure of the fluid just prior to bypassing the valving elements 160. Although the line 130 is connected at a particular location in FIG. 1, in other configurations, the line 130 may sense pressure at different location, for example, further upstream towards the inlet 110.

For a variety of reasons (e.g., due to various loads), the pressure differential, P1-P2, may change. Accordingly, the valve activation system 120 compares the pressure differential, P1-P2, to a set pressure $\Delta P_{set}$. If the error (P1-P2-$\Delta P_{set}$) is within a predefined threshold range, nothing occurs—the valve system 100 is balanced. However, if the pressure differential (P1-P2) deviates either above or below the desired pressure differential $\Delta P_{set}$ by an amount beyond the threshold, the valve activation system 120 causes a pressurizing or depressurizing of the chamber 168 to either open or close the valve by moving the plunger 164.

When the chamber 168 is pressurized through the fluid line 140, the plunger 164 moves towards the left and decreases the area through which fluid may flow therearound. In other words, the flow rate is reduced and the differential pressure through across load restriction is decreased. Contrariwise, when the chamber 168 is de-pressurized, the plunger moves towards the right—allowing flow rate to be increased—thereby increasing the differential pressure.

In de-pressurizing the chamber, the pressure in the chamber 168 may then be exhausted through fluid line 140 (the same fluid line that provided the pressure) and ultimately through the fluid line 150 for passage downstream through the outlet 190. In other configurations, the pressure in the chamber 168 may be exhausted through lines 140 towards another mechanism. Although not expressly shown, a biasing mechanism (e.g., a spring or the like) may be used to bias the plunger 164 towards the right for a depressurizing scenario. In such a configuration, the force of the pressure from fluid line 140 overcomes such a biasing to move the plunger 164 to the left.

Although a particular arrangement has been shown in FIG. 1 where supplying pressure closes valving elements 160, the same principles may be used in the opposite manner where supplying of a pressure opens valving elements 160. For example, a pressurization of the chamber 168 may move a plunger 164 to open an area through which fluid flows with a bias of the valve towards closing. The same or similar differential measurement may be made by the valve activation system 120, but accounting for the fact that the opposite scenario is occurring.

As referenced above, in particular configurations, the fluid flow may be completely disabled. Additionally, in particular configurations, a variable restriction may be utilized. For example, the further away from the pre-defined defined pressure differential, the faster the plunger 164 may be opened or close. However, as the pressure differential moves closer to the pre-defined pressure, the slower the plunger 164 may be opened or closed. Any suitable mechanism may be used for such a variable restriction including, for example, variable force springs.

The set pressure $\Delta P_{set}$ may be adjusted in a variety of manners in order to set pressure differential (P1-P2). In one configuration, the process may be manual where, for example, movement of a screw in or out adjusts the pressure or pressure differential. In other embodiments, $\Delta P_{set}$ may come from a mechanism that automatically sets based on, for example, an electronic signal from a building management system. Yet other mechanisms may also be utilized to set the pressure or pressure differential according to particular embodiments.

The valve activation system 120 may take on a variety of configurations. One non-limiting example is provided below with reference to FIGS. 2A, 2B, 2C, and 2D.

FIGS. 2A, 2B, 2C, and 2D further illustrate a particular configuration of a valve system 200, according to an embodiment of the disclosure. The valve system 200 of FIGS. 2A, 2B, 2C, and 2D generally operates in the same manner as that described with reference to the valve system 100 of FIG. 1 with an inlet 210, an outlet, 290, a valving element 260, a seat 263, a valve activation system 220, and fluid lines 225, 230, 240, 250.

Figure 2A:
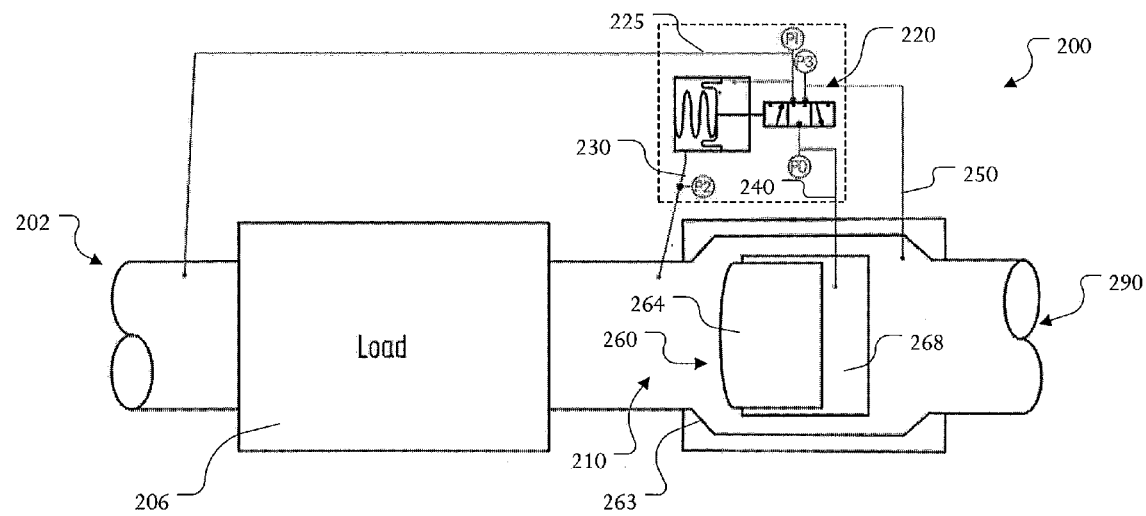
FIG. 2A shows a balanced state of a valve system, according to an embodiment of the disclosure.

With reference to FIG. 2A, a fluid inlet 202 supplies fluid to a load 206, which may could consist of one or more heat exchangers used to heat or cool air in a building. An exit of the fluid from the load is the inlet 210 described with reference to inlet 110 of FIG. 1. Particular embodiments may desire a certain pressure differential across the load 206. Accordingly, the set pressure, P1, may correspond to or be based upon a pressure upstream of the load 206, for example, as shown with a connection for line 225 upstream of the load 206.

With such a configuration, the valve system 200 may be self-acting as an upstream pressure that is before a load effectively provides the actuating force further downstream in regulating of a pressure differential across the load.

Figure 2B:
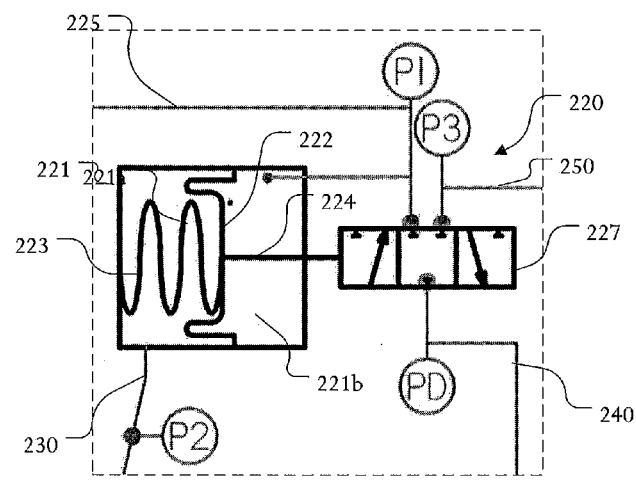
FIG. 2B is a blow-up of the dashed portion in FIG. 2A showing the details of the valve activation system, according to an embodiment of the disclosure.

FIG. 2B is a blow-up of the dashed portion in FIG. 2A showing the details of the valve activation system 220, according to an embodiment of the disclosure. In particular, a modified pilot valve configuration is shown. The valve activation system 220 includes a chamber 221, a diaphragm 222, a biasing mechanism 223, a rod 224 and a fluid circuit 227. Although this particular configuration is described, other suitable configurations may be utilized as will be recognized by one of ordinary skill in the art after having read the specification.

The diaphragm 222 fluidly separates the chamber 221 into a first side 221a and a second side 221b. On the first side 221a of the diaphragm 222 is a biasing mechanism 223 such a spring. The biasing mechanism supplies a force on the diaphragm 222. The pressure, P2, is also supplied as a force on side 221a of the diaphragm 222. The second side 221b is fed the set-point pressure, P1, and works against the combined forces of the biasing mechanism 223 and the pressure, P2. As referenced above, pressure, P1, may be provided in a plurality of manners. With specific reference to FIG. 2A, pressure, P1, is based or is the actual pressure from an upstream portion of the load 206. Additionally, in particular configurations, the biasing amount of the biasing member 223 may be modified using manual or automatic mechanisms to change a desired difference in pressure differential.

The rod 224 is connected to the diaphragm 222 and moves into or out of the chamber 221 depending on whether the pressure differential between P1 and P2, multiplied by the active area of the diaphragm 222, is greater or less than the force of biasing mechanism 223.

As seen in FIG. 2B, the rod 224 actuates a three-way fluid circuit 227 shown by a typical schematic representation. In such a representation, a rectangle is divided into a series of sections, representing different possible positions of the valve. As the valve is actuated, the contents of the sections are placed into the active area represented by connecting lines outside. This illustration shows three positions of the valve, with the current position being neutral providing no flow. Movement of the rod to the right would place the contents of the leftmost box where the center box currently is, allowing fluid to flow between PD and P3. Movement of the rod to the left would place the contents of the rightmost box in the position currently occupied by the center box, allowing flow between P1 and PD. Even though the illustration shows discrete states that are on or off, it is commonly understood that the passages created might be variable in their resistance to flow.

Figure 2C:
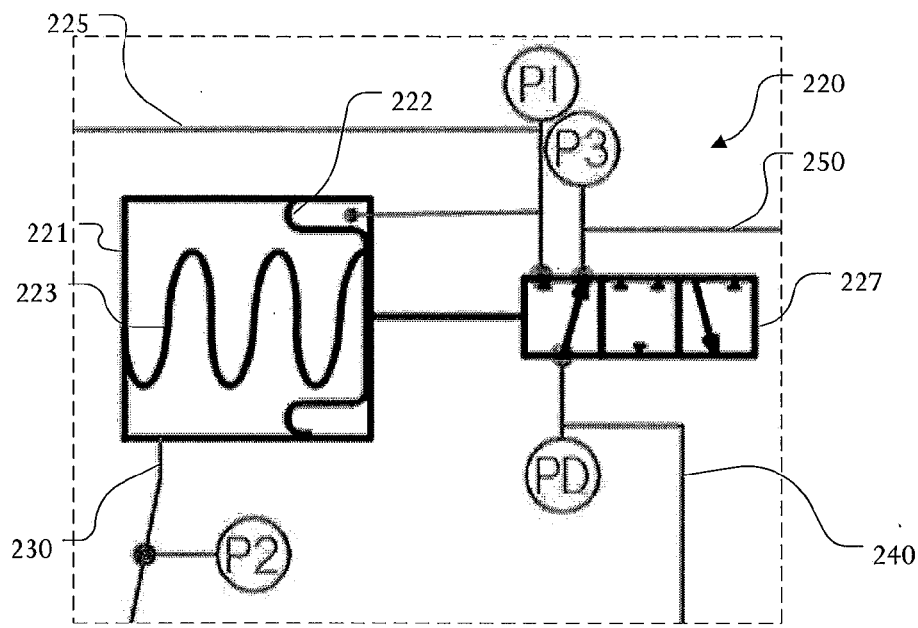
FIG. 2C shows the valve system of FIG. 2A in a valve opening state, according to an embodiment of the disclosure.
Figure 2D:
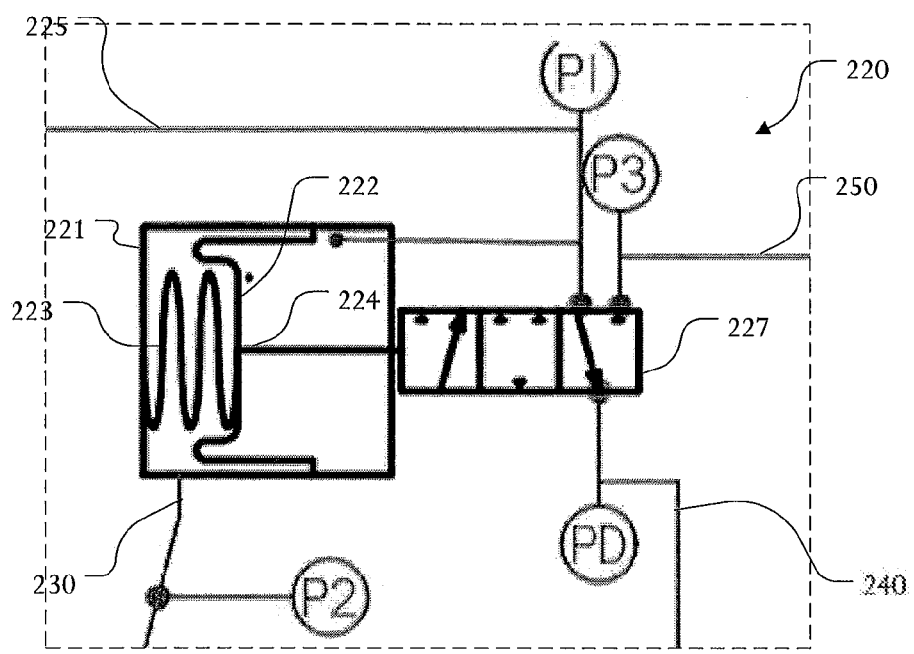
FIG. 2D shows the valve system of FIG. 2A in a valve closing state, according to an embodiment of the disclosure.

With reference to these particular positions, in the position of FIG. 2A, there is no transfer of the fluid either to or from line 240. In the position of FIG. 2C, line 240 has been connected to line 250 for a draining of chamber 268. In FIG. 2D, line 225 has been connected to line 250 for a pressurizing of the chamber.

Again, it should be expressly understood that although particular configurations are shown in FIGS. 2A, 2B, 2C, and 2D, other configurations can avail from teachings of this disclosure.

With reference again to FIG. 2A, a balanced state of the valve system 200 is shown, which can generally be represented by the following equation:

$$Fs=(P1-P2)*A$$

Where Fs is the force from the spring, A is the active area of the diaphragm, P1 is the pressure acting in the opposite side of the diaphragm from the spring, and P2 is the pressure on the same side of the diaphragm as the spring.

In the balanced state, there is no movement of the plunger 264 to either an opening or a closing position.

FIG. 2C shows the valve system 200 in a valve opening state, which can generally be represented by the following equation:

$$Fs>(P1-P2)*A$$

In other words, the pressure differential (P1–P2) has grown small enough (P2 with the biasing mechanism 223 is overpowering P1) that the chamber 268 has now switched to a draining scenario. In particular, the fluid circuit 227 has fluidly connected line 240 to line 250. In such a scenario, a pressure, PD, of the chamber 268 is initially larger than P3. However, when enough pressure has been released, the pressure, PD, will equalize and become the same as P3.

FIG. 2D shows the valve system 200 in a valve closing state, which can generally be represented by the following equation:

$$Fs<(P1-P2)*A$$

In other words, the pressure differential (P1–P2) has grown large enough (P1 overpowers P2 with the biasing mechanism) that the chamber 268 has now switched to a pressurizing scenario. In particular, the fluid circuit 227 mechanism 227 has connected line 240 to pressure, P1 (and any other pressure mechanisms). In such a scenario, a pressure, P1 (and any other pressure mechanisms) is larger than PD (the pressure in the chamber) and will pressurize the chamber until the fluid circuit 227 mechanism changes to another position.

Figure 3A:
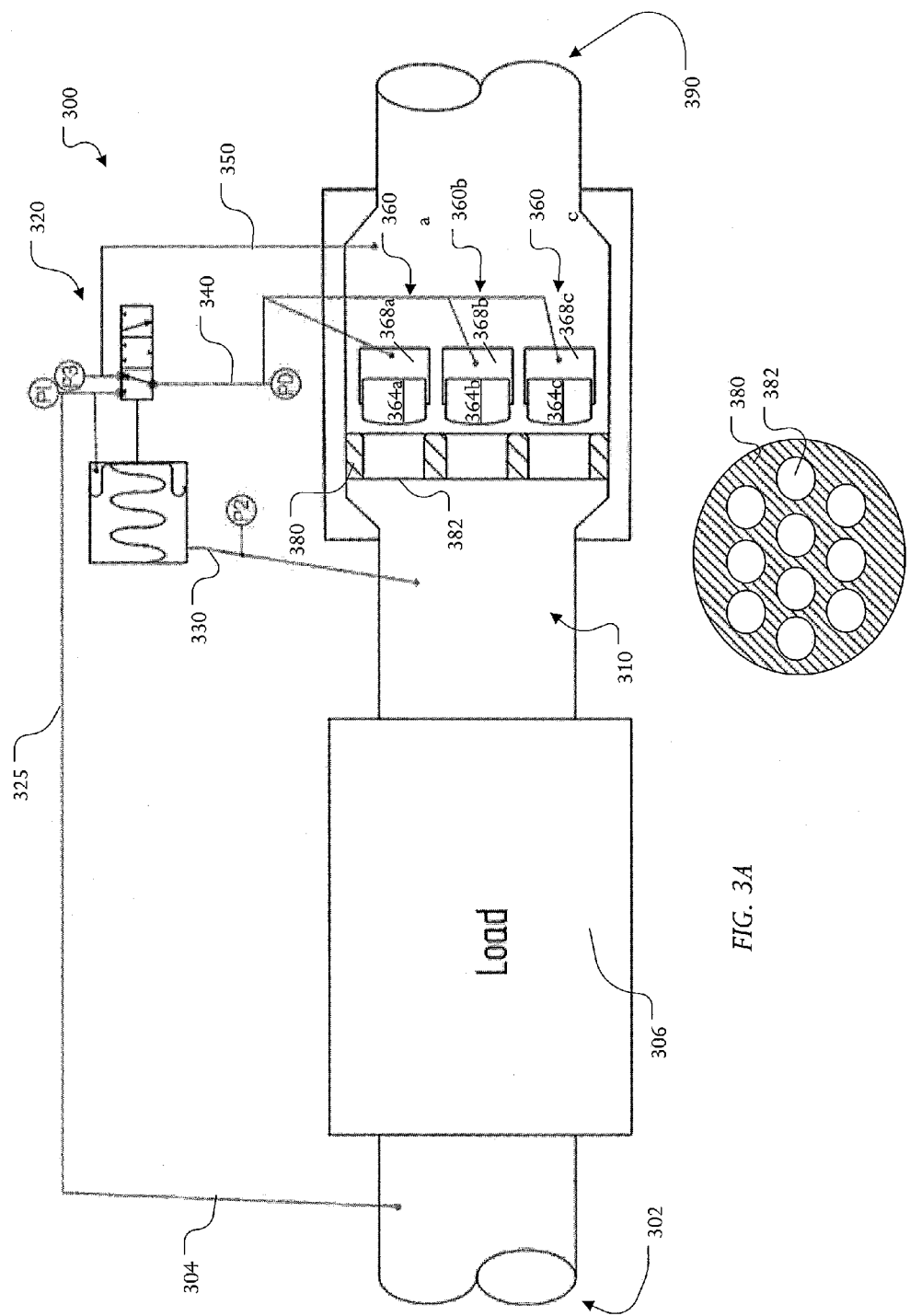
FIGS. 3A and 3B illustrates yet another configuration of a valve system, according to an embodiment of the disclosure.
Figure 3B:
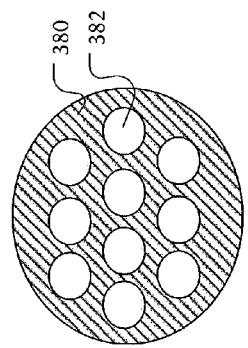

FIGS. 3A and 3B illustrate yet another configuration of a valve system 300, according to an embodiment of the disclosure. The valve system 300 of FIG. 3A generally operates in the same manner as that described with reference to the valve system 100 of FIG. 1 with an inlet 310, an outlet, 390, a valve activation system 320, and fluid lines 325, 330, 340, 350. Additionally, there is a load 306 between an inlet 302 and the inlet 310. However, the valve system 300 has the following additional details. There are multiple valving elements 360a, 360b, and 360c with corresponding chambers 368a, 368b, and 368c, and plungers 364a, 364b, and 364c. Although three valving elements 360a, 360b, and 360c are shown in this configuration, in other configurations more than three or less than three may be utilized. Additionally, while each of the three valving elements 360a, 360b, and 360c is shown as having a similar shape and size, they may have different sizes and shapes.

In operation, the multiple valving elements 360a, 360b, and 360c collectively work together to restrict or allow a flow volume between the inlet 310 and the outlet 390 of the conduit. The flow volume, in turn, modifies the pressure or pressure differential.

Each respective chamber 368a, 368b, and 368c is shown connected by the same line 340, which in this particular embodiment is used for pressurizing and depressuring the chambers 368a, 368b, and 368c. Thus, according to particular embodiments, a plurality of valving elements 360a, 360b, and 360c can be driven by a shared pilot valve or shared pressuring source. In yet other configurations, a plurality of serial pilot valves work in concert to provide a common pressurizing source that may be utilized to drive the plurality of valving elements. In still yet other configurations, a first pilot valve may control a first set of valving elements and a second pilot valve may control a second set of valving elements.

A wall 380 is shown that may contain a plurality of openings 382. The wall may be placed adjacent the valving element 360 within the conduit 305 in order to direct the flow of fluid through the respective openings 382 and adjacent the plungers 364a, 364b, and 364c. The multiple valving elements 360 selectively restrict passage of fluid, for example, by covering the openings 382.

In operation, each of the valving elements 360 need not be in the same state. This is because the common pressure through line 340 is supplied until the desired pressure differential (P2-P1) is achieved. Additionally, the plurality of valving elements 360 work together to provide the desired flow rate and hence, pressure. Accordingly, valving element 360a may have closed off a respective opening 382 by 20 percent whereas the other two valving elements 360b, 360c may have closed off their respective openings 382 by 25 percent.

As referenced earlier, in particular configurations, a variable restriction may be utilized. For example, the further away from the pre-defined defined pressure differential, the faster the pressure differential may be changed. However, as the pressure differential moves closer to the pre-defined pressure differential, the slower the pressure differential may be changed. In particular embodiments, this may be accomplished through a manipulation of the make-up of valving elements, for example, having some smaller than others and having different biasing strengths.

A variety of other advantages may also be availed in particular embodiments through the use of a plurality of valving elements 360 that work in concert with one another. For example, in the case of a valving element that has flow entering axially and exiting radially (or vice versa), the area of opening of the restricting element is typically approximated conically or cylindrically. The area of the opening therefore depends on the circumference of the element and the length of the opening. As the elements are increased in diameter, the height of the lift therefore has to increase in direct proportion. In the meantime, the area of the round opening increases with the square of the diameter. Accordingly, several valving elements in parallel having the same cross-sectional area can have less stroke than a comparable single valving element. According to particular embodiments, this reduces the cost for a given flow rate and reduces the size of the overall valve.

Additionally, according to particular embodiments, each of the valving elements can be sized such that they are easy to machine. That is to say, very large valving elements typically require special machinery, while valving elements below a certain size can be made using ordinary machinery.

Yet another advantage that may be availed from particular embodiments is the ability to make a relatively large numbers of valving elements. This allows efforts to perfect the valving elements to apply to a larger number of valves.

Yet another advantage that may be availed from particular embodiments is the ability to emulate larger and larger valve size by simply can be placing more valving elements in parallel. In other words, the plurality of valving elements working together function like a much larger valve. In such scenarios, the pilot valve might also have to be increased in size, or possibly more than one pilot valve might be used. Being able to play several valving elements in parallel allows the valve to be dealt with relatively little development time and with many of the parts being readily available from inventory.

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for regulating a pressure differential, the system comprising:
    a plurality of valving elements that work together to provide a desired flow rate or a desired pressure, each of the plurality of valving elements configured to selectively allow and restrict at least a portion of a flow of fluid between an inlet and a common outlet of a conduit through a respective opening and closing of each respective valving element;
    a valve activation system configured to supply a common driving pressure to the plurality of valving elements, the common driving pressure configured to:
    initiate at least one of the opening or closing of the plurality of valving elements, or
    initiate the other of the opening or closing of the plurality of valving elements; and
    wherein the valve activation system is configured to:
        receive a first pressure and a second pressure, the first and second pressures received from locations in the conduit upstream of the plurality of valving elements, the first pressure received from a location upstream of the plurality of valving elements before a load and the second pressure received from a location upstream of the plurality of valving elements after the load,
        initiate at least one of the opening or closing of the plurality of valving elements when the pressure differential between the first pressure and the second pressure has decreased beyond a pre-defined threshold, and
        initiate the other of the opening or closing of the plurality of valving elements when the pressure differential between the first pressure and the second pressure has increased beyond a pre-defined threshold.

2. The system of claim 1, wherein
each of the plurality of valving elements includes a chamber, and
the valve activation system in the initiating the at least one of the opening or closing of the plurality of valving elements and the initiating the other of the opening or closing of plurality of valving elements element either allows the chambers to be pressurized or depressurized, and the valve activation system is further configured to:
    connect the first pressure to the chambers as at least a portion of the common driving pressure during a pressurizing of the chambers, and
    connect the chambers to a fluid line in communication with a location in the conduit downstream from the plurality of valving elements during a depressurizing of the chamber.

3. The system of claim 1, wherein
each of the plurality of valving elements includes a chamber, and
the valve activation system in the initiating the at least one of the opening or closing of the plurality of valving elements and the initiating the other of the opening or closing of the plurality of valving elements element either allows the chambers to be pressurized or depressurized.

4. The system of claim 1, wherein at least two of the plurality of valving elements have different sizes.

5. The system of claim 1, further comprising:
a common line configured to relieve pressure from the plurality of valving elements.

6. The system of claim 1, further comprising:
a wall positioned in the conduit, the wall containing a plurality of openings, each of the plurality of openings positioned adjacent at least one of the plurality of valving elements in order to force the flow of fluid through the respective opening up against a sealing member of the at least one of the plurality of openings, wherein each sealing member is configured to selectively cover and uncover the respective opening in the wall in the opening and closing of the at least one plurality of valving elements to allow the desired flow rate or the desired pressure for the plurality of valves.

7. The system of claim 1, wherein either the pressure differential or the pre-defined threshold is modifiable.

8. The system of claim 1, wherein a degree of opening or closing of one valving element modifies the degree of opening or closing of the remainder of the plurality of valving elements in the plurality of valves working together to provide the desired flow rate or the desired pressure.

9. The system of claim 1, wherein the plurality of valves in working together to provide the desired flow rate or the desired pressure can have different degrees of opening or closing of each respective valving element.

10. A system for regulating a pressure differential, the system comprising:
a plurality of valving elements that work together to provide a desired flow rate or a desired pressure, each of the plurality of valving elements configured to selectively allow and restrict at least a portion of a flow of fluid between an inlet and a common outlet of a conduit through a respective opening and closing of each respective valving element;
a valve activation system configured to supply a common driving pressure to the plurality of valving elements, the common driving pressure configured to:
initiate at least one of the opening or closing of the plurality of valving elements, or
initiate the other of the opening or closing of the plurality of valving elements;
wherein the valve activation system is configured to:
receive a first pressure and a second pressure, the first and second pressures received from locations in the conduit upstream of the plurality of valving elements,
initiate at least one of the opening or closing of the plurality of valving elements when the pressure differential between the first pressure and the second pressure has decreased beyond a pre-defined threshold, and
initiate the other of the opening or closing of the plurality of valving elements when the pressure differential between the first pressure and the second pressure has increased beyond a pre-defined threshold; and
wherein the pre-defined threshold is a range of temperature differentials.

11. The system of claim 10, wherein the valve activation system further comprises a pilot valve.

12. A system of claim 10, wherein the valve activation system is electronic and initiates the opening or closing of valving elements based on at least one signal from at least one sensor.

13. The system of claim 10, wherein
each of the plurality of valving elements includes a chamber, and
the valve activation system in the initiating the at least one of the opening or closing of the plurality of valving elements and the initiating the other of the opening or closing of the plurality of valving elements element either allows the chambers to be pressurized or depressurized.

14. The system of claim 10, wherein at least two of the plurality of valving elements have different sizes.

15. The system of claim 10, wherein, further comprising:
a common line configured to relieve pressure from the plurality of valving elements.

16. The system of claim 10, further comprising:
a wall positioned in the conduit, the wall containing a plurality of openings, each of the plurality of openings positioned adjacent at least one of the plurality of valving elements in order to force the flow of fluid through the respective opening up against a sealing member of the at least one of the plurality of openings,
wherein each sealing member is configured to selectively cover and uncover the respective opening in the wall in the opening and closing of the at least one plurality of valving elements to allow the desired flow rate or the desired pressure for the plurality of valves.

17. The system of claim 10, wherein either the pressure differential or the pre-defined threshold is modifiable.

18. A system for regulating a pressure differential, the system comprising:
a plurality of valving elements that work together to provide a desired flow rate or a desired pressure, each of the plurality of valving elements configured to selectively allow and restrict at least a portion of a flow of fluid between an inlet and a common outlet of a conduit through a respective opening and closing of each respective valving element;
a valve activation system configured to supply a common driving pressure to the plurality of valving elements, the common driving pressure configured to:
initiate at least one of the opening or closing of the plurality of valving elements, or
initiate the other of the opening or closing of the plurality of valving elements; and
wherein the valve activation system further comprises:
a chamber configured to determine a pressure differential, the chamber divided into a first portion and second portion by a diaphragm, the first portion containing a biasing member and receiving a second pressure, the second portion receiving a first pressure, the second pressure and the biasing member providing a force on the diaphragm from a first side, and the first pressure proving a force on the diaphragm from a second side;
a rod configured to move when the force from either the first side or the second side of the diaphragm is greater than the force from the other of the first side or the second side; and
a fluid circuit mechanism connected to the rod and having more than one position for a connection of fluid lines, the fluid circuit mechanism moving to respective positions upon the rod moving, at least a first position of the fluid circuit mechanism connecting fluid lines to pressurize the common driving pressure, and at least a second position of the fluid circuit mechanism connecting fluid lines to depressurize the common driving pressure.

19. The system of claim 18, wherein valve activation system is further configured to:
connect the first pressure to the chambers as at least a portion of the common driving pressure during a pressurizing of the chambers, and
connect the chambers to a fluid line in communication with a location in the conduit downstream from the plurality of valving elements during a depressurizing of the chamber.

20. The system of claim 18, wherein the valve activation system further comprises a pilot valve.

21. A system of claim 18, wherein the valve activation system is electronic and initiates the opening or closing of valving elements based on at least one signal from at least one sensor.

22. The system of claim 18, wherein at least two of the plurality of valving elements have different sizes.

23. The system of claim 18, wherein, further comprising:
a common line configured to relieve pressure from the plurality of valving elements.

24. The system of claim 18, further comprising:
a wall positioned in the conduit, the wall containing a plurality of openings, each of the plurality of openings positioned adjacent at least one of the plurality of valving elements in order to force the flow of fluid through the respective opening up against a sealing member of the at least one of the plurality of openings, wherein each sealing member is configured to selectively cover and uncover the respective opening in the wall in the opening and closing of the at least one plurality of valving elements to allow the desired flow rate or the desired pressure for the plurality of valves.

\* \* \* \* \*